(12) United States Patent
Zheng et al.

(10) Patent No.: US 10,408,938 B2
(45) Date of Patent: Sep. 10, 2019

(54) FAST SCAN DETECTION METHOD

(71) Applicant: BENEWAKE (BEIJING) TECH. CO. LTD, Beijing (CN)

(72) Inventors: Kai Zheng, Beijing (CN); Rui Wang, Beijing (CN); Yuan Li, Beijing (CN)

(73) Assignee: BENEWAKE (BEIJING) TECH. CO, LTD., Beijing (CN)

( * ) Notice: Subject to any disclaimer, the term of this patent is extended or adjusted under 35 U.S.C. 154(b) by 17 days.

(21) Appl. No.: 15/620,691

(22) Filed: Jun. 12, 2017

(65) Prior Publication Data

US 2018/0059244 A1 Mar. 1, 2018

(30) Foreign Application Priority Data

Aug. 29, 2016 (CN) .......................... 2016 1 0751047

(51) Int. Cl.
*G01S 17/08* (2006.01)
*G01S 17/42* (2006.01)
*G01S 7/481* (2006.01)
*G01S 17/89* (2006.01)

(52) U.S. Cl.
CPC ............ *G01S 17/08* (2013.01); *G01S 7/4813* (2013.01); *G01S 7/4817* (2013.01); *G01S 17/42* (2013.01); *G01S 17/89* (2013.01)

(58) Field of Classification Search
CPC ......... G01S 17/08; G01S 17/42; G01S 17/89; G01S 7/4813; G01S 7/4817
See application file for complete search history.

(56) References Cited

U.S. PATENT DOCUMENTS

| 4,829,172 A | * | 5/1989 | Miller | G01S 7/4812 250/205 |
| 5,177,462 A | * | 1/1993 | Kajiwara | B60Q 9/008 180/167 |
| 5,202,742 A | * | 4/1993 | Frank | G01S 7/4811 180/167 |
| 2001/0012016 A1 | * | 8/2001 | Ide | G01S 7/4811 345/582 |
| 2006/0184274 A1 | * | 8/2006 | Sakai | G05D 1/0246 700/245 |
| 2016/0100521 A1 | * | 4/2016 | Halloran | A01D 34/008 180/169 |

FOREIGN PATENT DOCUMENTS

| CN | 102004254 B | 4/2014 |
| CN | 104655097 A | 5/2015 |

* cited by examiner

*Primary Examiner* — Michael C Bryant
(74) *Attorney, Agent, or Firm* — Schwabe Williamson & Wyatt, PC

(57) ABSTRACT

A fast scan detection method is provided. The fast scan detection method is applied to a rotatable scan detection device where two or more detection samplings are performed for calculating each scan detection distance value, where each of the detection samplings includes: emitting, by an emission light source, infrared detection light, where the infrared detection light propagates through a surrounding space and is reflected by a detected object when the infrared detection light encounters the detected object; and receiving, by a photoelectric sensor in a reception unit, the infrared detection light reflected by the detected object, where the rotatable scan detection device performs one detection sampling at each detection angular position at which the rotatable scan detection device is positioned.

8 Claims, 4 Drawing Sheets

FAST SCAN DETECTION METHOD

CROSS REFERENCE TO RELATED APPLICATION

The present application claims the priority to Chinese Patent Application No. 201610751047.0, titled "FAST SCAN DETECTION METHOD", filed on Aug. 29, 2016 with the State Intellectual Property Office of the PRC, which is incorporated herein by reference in its entirety.

FIELD

The disclosure relates to the technical field of optical ranging, and in particular to a fast scan detection method.

BACKGROUND

An optical rotatable scan detection device is a device for performing non-contact scan detection using collimated light beam through a triangulation method, a Time of Flight (TOF) method and the like. Currently, an optical rotatable scan detection device based on the Time of Flight method generally includes a light emission module, an optical lens, a chip for receiving and processing signals, a motor, a bearing and an electrically conductive slip ring. The light emission module emits a detection light beam. The optical lens is located on a light path of the light emission module. The collimated light beam is incident onto a surface of a detected object, and reflected by an obstacle into a reception chip. The reception chip can calculate a distance between the detected object and the optical rotatable scan detection device based on a time between emission and reception of the detection light beam, a phase difference between the emitted detection light beam and the received detection light beam and the known light velocity. In this type of device, the light emission module, the optical lens, the light reception module and the like, which are used for ranging, are mounted on a platform which can rotate continuously, thereby implementing scanning using the collimated light beam. Environment distance signals covering 360 degrees can be acquired with rotation of the motor.

In the conventional technology, the ranging device needs to perform multiple data samplings for measuring a distance from a same detection region. For example, in the calculation procedure of a phase based Time of Flight method, four data samplings are required for measuring a distance from a detection region, so as to acquire an accurate detection distance value, where a next data sampling is performed only when processing and transmission after each data sampling is performed. The specific procedure is as follows. Firstly, a control unit transmits a measurement command to a ranging chip. The ranging chip controls an infrared light source to emit four modulated pulse. The emitted modulated infrared light signals encounter an obstacle and are reflected. The ranging chip receives the infrared light signals reflected by the obstacle and records magnitudes of the four returned signals respectively, which are used as magnitudes of detection sampling signals having phases of 0 degrees, 90 degrees, 180 degrees and 270 degrees, respectively. The ranging chip performs four detection samplings on a same detection region in the above manner, and acquires the distance value between the ranging chip and the obstacle after calculation.

In the above conventional technology, multiple detections are required for calculating the distance value from a same detection region. In actual applications of the ranging device, distances needs to be detected rapidly. For example, a rotatable scan detection device needs to rotate at a speed of 3 to 5 revolutions per second or even faster, so as to increase a distance measurement speed and a data updating frequency. However, in the conventional detection method where multiple data samplings are required for calculating one distance value, the ranging device needs to remain at a same rotation angle for a period long enough to perform multiple detection samplings and associated calculations in order to acquire one distance value. In a case that the ranging device remains at a same rotation angle for an excessively long period, it is difficult for the ranging device to rotate in a high speed continuously, thus the distance scan and measurement speed is reduced. In a scan ranging device rotating at a high speed, to calculate a distance from one location by multiple samplings may cause inconsistency in targets corresponding to the sampling points, thereby resulting in motion blur, which causes a range error. Further, if the rotatable mechanism remains at a same position for four samplings of each distance measurement, a great vibration may be produced, and a high rotation speed cannot be achieved.

Based on the above deficiency in the conventional technology, a fast scan detection method is provided according to the present disclosure. Particularly, a fast scan detection method using an array photoelectric sensor in a ranging unit is provided according to the present disclosure.

SUMMARY

In order to solve the technical issue in the conventional ranging device that, distances cannot be detected continuously and rapidly since multiple data samplings need to be performed on a same detection region in order to acquire one distance value, a fast scan and detection method is provided according to the present disclosure. The fast scan detection method is applied to a rotatable scan detection device, where two or more detection samplings are performed for calculating each scan detection distance value, and each of the detection samplings includes:

emitting, by an emission light source, infrared detection light, where the infrared detection light propagates through a surrounding space and is reflected by a detected object when the infrared detection light encounters the detected object; and receiving, by a photoelectric sensor in a reception unit, the infrared detection light reflected by the detected object, where the rotatable scan detection device performs one detection sampling at each detection angular position at which the rotatable scan detection device is positioned.

In an embodiment, the photoelectric sensor is an array photoelectric sensor including multiple photoelectric sensors which are arranged in M rows and N columns and operate independently, where M is greater than or equal to 1, and N is greater than or equal to 2.

In an embodiment, at any two neighboring detection angular positions at which the rotatable scan detection device is positioned, the photoelectric sensors in different areas of the array photoelectric sensor perform detection samplings on a same detection region in the surrounding space.

In an embodiment, at X neighboring detection angular positions at which the rotatable scan detection device is positioned, the photoelectric sensors in X different areas of the array photoelectric sensor perform detection samplings on a same detection region in the surrounding space, where X is the number of detection samplings performed for calculating each scan detection distance value.

In an embodiment, the number of columns of the photoelectric sensors in each photoelectric sensor area of the array photoelectric sensor ranges from one to N divided by the number of detection samplings performed for calculating each scan detection distance value, inclusively.

In an embodiment, the rotatable scan detection device rotates from one detection angular position to a next detection angular position neighboring to the one detection angular position in a data processing period during each detection sampling, where the emission light source and the photoelectric sensor do not operate in the data processing period.

In an embodiment, the fast scan detection method may further include:

calculating, by a signal processing unit, a distance value between the rotatable scan detection device and an object in the surrounding space corresponding to a photoelectric sensor area R1 at a current detection angular position of the rotatable scan detection device based on detection sampling data acquired by photoelectric sensors in the photoelectric sensor area R1 at the current detection angular position and detection sampling data acquired at immediately pervious Y detection angular positions for a same detection region in the surrounding space, where Y equals to the number of detection samplings performed for calculating each scan detection distance value minus 1; and stitching, by the signal processing unit, distance values acquired at detection angular positions within 360 degrees, to acquire a three-dimensional data image which covers horizontally 360 degrees and includes distance values at M different positions in a vertical direction.

In an embodiment, the fast scan detection method is based on a Time of Flight method, and the distance value is calculated based on four detection samplings.

In an embodiment, the fast scan detection method may include:

calculating, by a signal processing unit, a distance value between the rotatable scan detection device and an object in the surrounding space corresponding to a photoelectric sensor area R1 at a current detection angular position of the rotatable scan detection device based on detection sampling data acquired by photoelectric sensors in the photoelectric sensor area R1 at the current detection angular position and detection sampling data acquired at immediately pervious three detection angular positions for a same detection region in the surrounding space.

In an embodiment, the fast scan detection method is applicable for a walking robot, a robot cleaner, or an unmanned aerial vehicle to perform distance scan and detection on the surrounding space.

With the fast scan detection method according to the present disclosure, since four samplings required for each detection is reduced to only one sampling, and the processing time of the chip for the four samplings can be saved. Sampling and calculation of the processor can be performed in parallel, thus the time required for a single ranging is significantly reduced, angular deviations due to rotation is reduced, and the motion blur is eliminated. Therefore, the scan detection device can rotate rapidly and continuously. In addition, after the emission light source emits the infrared detection light, and after the photoelectric sensor receives the reflected infrared detection light, the rotatable scan detection device needs time to store and process data. With the fast scan detection method according to the present disclosure, the time for data processing during each detection sampling can be fully utilized by a rotatable housing to rotate from a detection angular position to a next detection angular position, thus scan and detection during continuous fast rotation can be implemented.

DETAILED DESCRIPTION OF THE EMBODIMENTS

The technical solutions according to the embodiments of the present disclosure are described clearly and completely in conjunction with the drawings hereinafter, such that the solution of the present disclosure can be better understood by those skilled in the art. It is apparent that the described embodiments are only a few rather than all of the embodiments according to the present disclosure. Any other embodiments obtained by those skilled in the art based on the embodiments in the present disclosure without any creative work fall into the protection scope of the present disclosure.

The present disclosure relates to a fast scan detection method, where a rotatable housing of a scan detection device continuously rotates relative to a base during detection of distances, thereby implementing fast scan of 360 degrees and acquiring distance information. The fast scan detection method according to the present disclosure is particularly applied to a rotatable scan detection device where two or more detection samplings are required for calculating each scan detection distance value.

Figure 1:
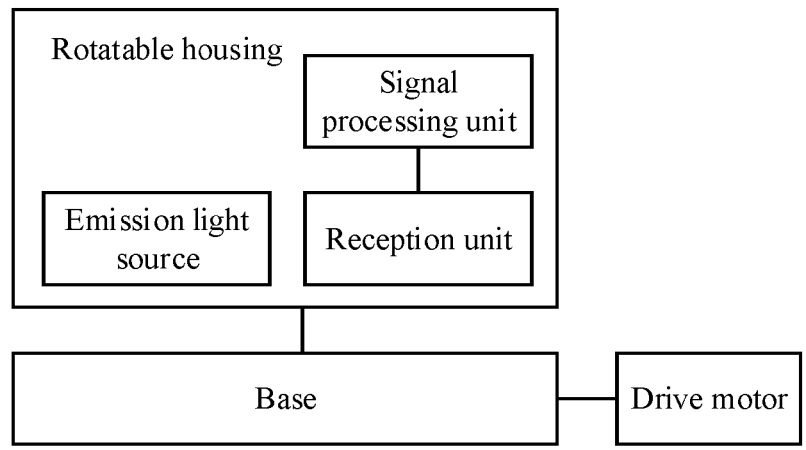
FIG. 1 is a schematic structural diagram of a rotatable scan detection device according to an embodiment of the present disclosure.
Figure 2:
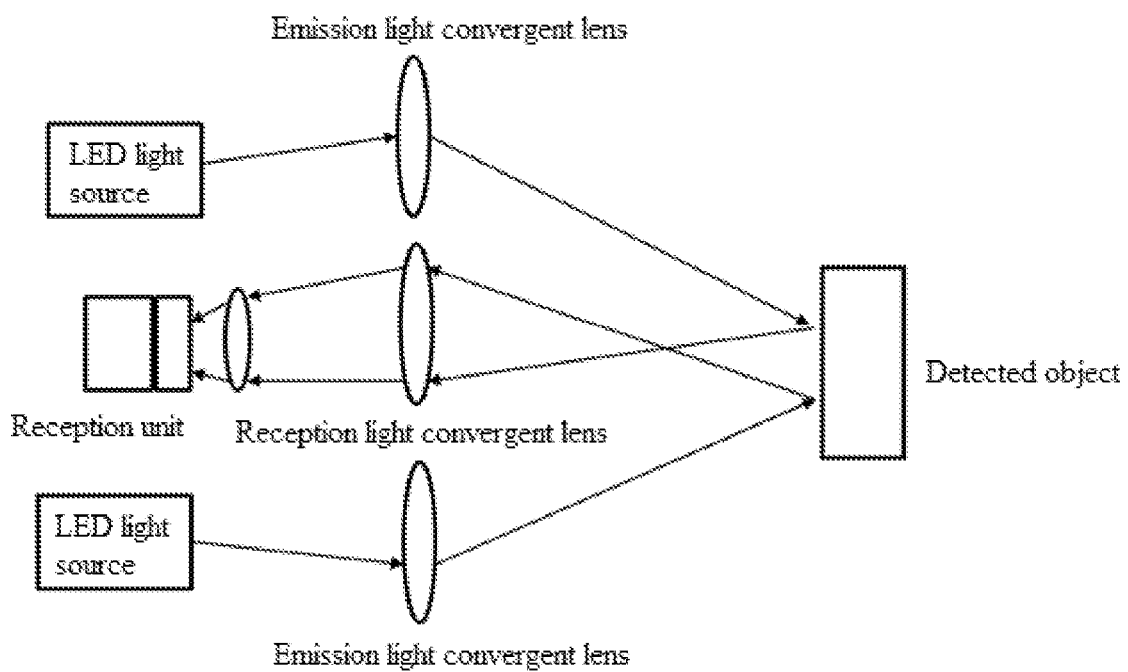
FIG. 2 is a schematic diagram illustrating light paths of the rotatable scan detection device according to an embodiment of the present disclosure.
Figure 3:
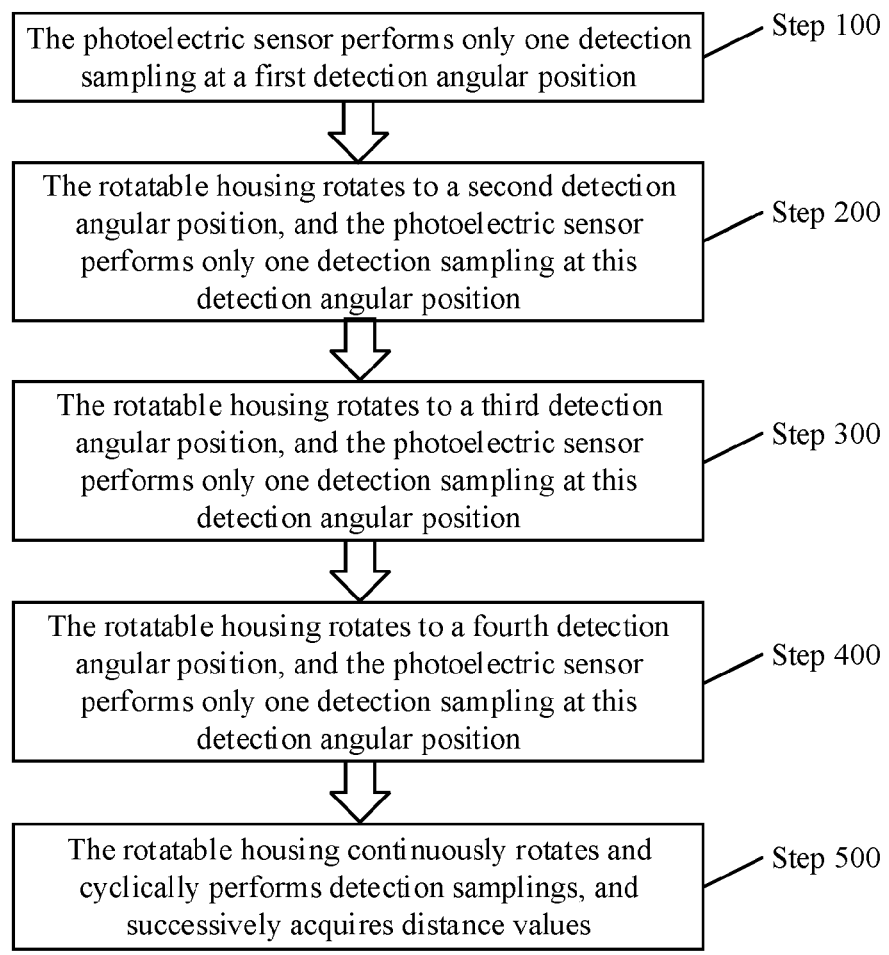
FIG. 3 is a flow chart illustrating steps of a fast scan detection method according to an embodiment of the present disclosure.

An embodiment of a device to which the fast scan detection method is applicable is exemplified in the present disclosure, the present disclosure, however, is not limited to the embodiment of the device. All rotatable scan detection devices where two or more detection samplings are required for calculating each scan detection distance value are within the scope of the application of the fast scan detection method according to the present disclosure. As shown in FIG. 1 and FIG. 2, the rotatable scan detection device according to an embodiment to which the fast scan detection method according to the present disclosure is applicable includes an emission light source, a reception unit, a signal processing unit, an angle determination unit and a drive motor.

The emission light source is fixed in a rotatable housing and configured to emit infrared detection light under control of a control signal. The infrared detection light propagates through the surrounding space and is reflected by a detected object when encountering the detected object. The emission light source is an LED light source or a laser light source. The infrared detection light propagating through space is a light beam having a certain cross section and a small divergence angle. The infrared detection light emitted by the LED light source or the laser light source propagates through a light transmission hole arranged on the rotatable housing and into the surrounding space to be detected outside of the rotatable housing. In a preferred embodiment, an emission light convergent lens is arranged on a light path of emission light path of the emission light source, to converge the emitted infrared detection light.

The reception unit is fixed in the rotatable housing and is provided with a photoelectric sensor. The photoelectric sensor is configured to receive the infrared detection light reflected by the detected object, convert the light into an electrical signal. In a preferred embodiment, a reception light convergent lens or an imaging lens is arranged on a light path of reception light of the photoelectric sensor, so as to converge the infrared detection light reflected by an obstacle or the like on the photoelectric sensor.

The signal processing unit is electrically connected with the photoelectric sensor and configured to calculate a distance between the rotatable scan detection device and the detected object based on the electrical signal converted by the photoelectric sensor using the Time of Flight method, or any other distance calculation method where two or more detection samplings are required for calculating one distance value.

The angle determination unit is configured to determine an angular position of the rotatable housing. In an embodiment, the angle determination unit is a photoelectric coded disk.

The drive motor is controlled to enable the rotatable housing to continuously rotate relative to the base. The rotation speed of the rotatable housing is adjusted by controlling a rotation speed of the drive motor. In an embodiment, the drive motor is located in the base and drives the rotatable housing to rotate in a direct drive manner. In an optional embodiment, the drive motor is located on a side of the base or under the base and drive the rotatable housing to rotate through a transmission mechanism such as a driving belt or a gear wheel.

Figure 4:
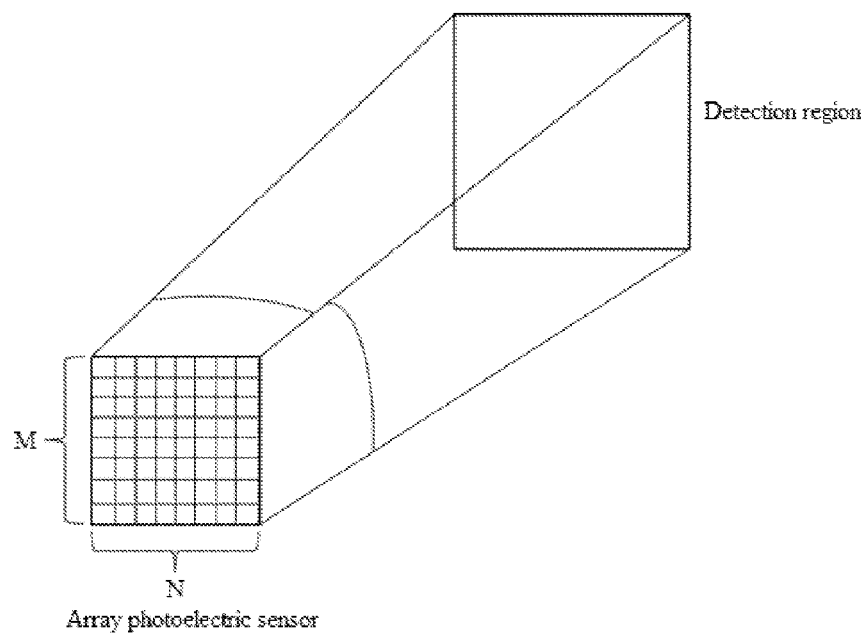
FIG. 4 is a schematic diagram of an array photoelectric sensor of the rotatable scan detection device according to an embodiment of the present disclosure.

The photoelectric sensor in the above reception unit is an array photoelectric sensor including multiple photoelectric sensors which are arranged in M rows and N columns, where M is greater than or equal to 1, and N is greater than or equal to 2. As shown in FIG. 4, the array photoelectric sensor includes M*N independent photoelectric sensors arranged in a same plane. Each photoelectric sensor operating independently is capable of independently detecting the infrared detection light, and operating in combination with the signal processing unit to acquire independent one or multiple detection samplings, or operating in combination with the signal processing unit to acquire its own complete distance information.

The fast scan detection method according to the present disclosure is described in detail in conjunction with an embodiment. In this embodiment, the photoelectric sensor in the reception unit is a planar array photoelectric sensor including 64 photoelectric sensors operating independently arranged in 8 rows and 8 columns. The photoelectric sensors are CCD photoelectric sensors or CMOS photoelectric sensors. In the detection method based on the Time of Flight, four detection samplings, which are DCS0, DCS1, DCS2 and DCS3, are performed for a same detection region. The final distance value D may be calculated using the following equation:

$$D = \frac{1}{2}\frac{C}{2\pi f}\arctan\left(\frac{DCS0 - DCS2}{DCS1 - DCS3}\right),$$

where C is the velocity of light in vacuum, f is a frequency of a modulation signal, and DCS0, DCS1, DCS2 and DCS3 are magnitudes of signals for detection samplings having phases of 0 degrees, 90 degrees, 180 degrees and 270 degrees, respectively. In a traditional TOF method, the rotatable housing of the rotatable scan detection device rotates to a certain angle, performs four detection samplings for the detection region, acquires the above four magnitudes of signals for detection samplings DCS0, DCS1, DCS2 and DCS3, and calculating the distance value. Only after the distance value is calculated, the rotatable housing of the rotatable scan detection device rotates to a next angle, performs four detection samplings and distance calculation for the next angle.

It is to be noted that, the fast scan detection method according to the present disclosure is applicable to all scan detection devices where multiple detection samplings, for example, two or more detection samplings are required for obtaining distance information of one distance value, and is not limited to the above scan detection device based on the Time of Flight, where four detection samplings are required.

Figure 5:
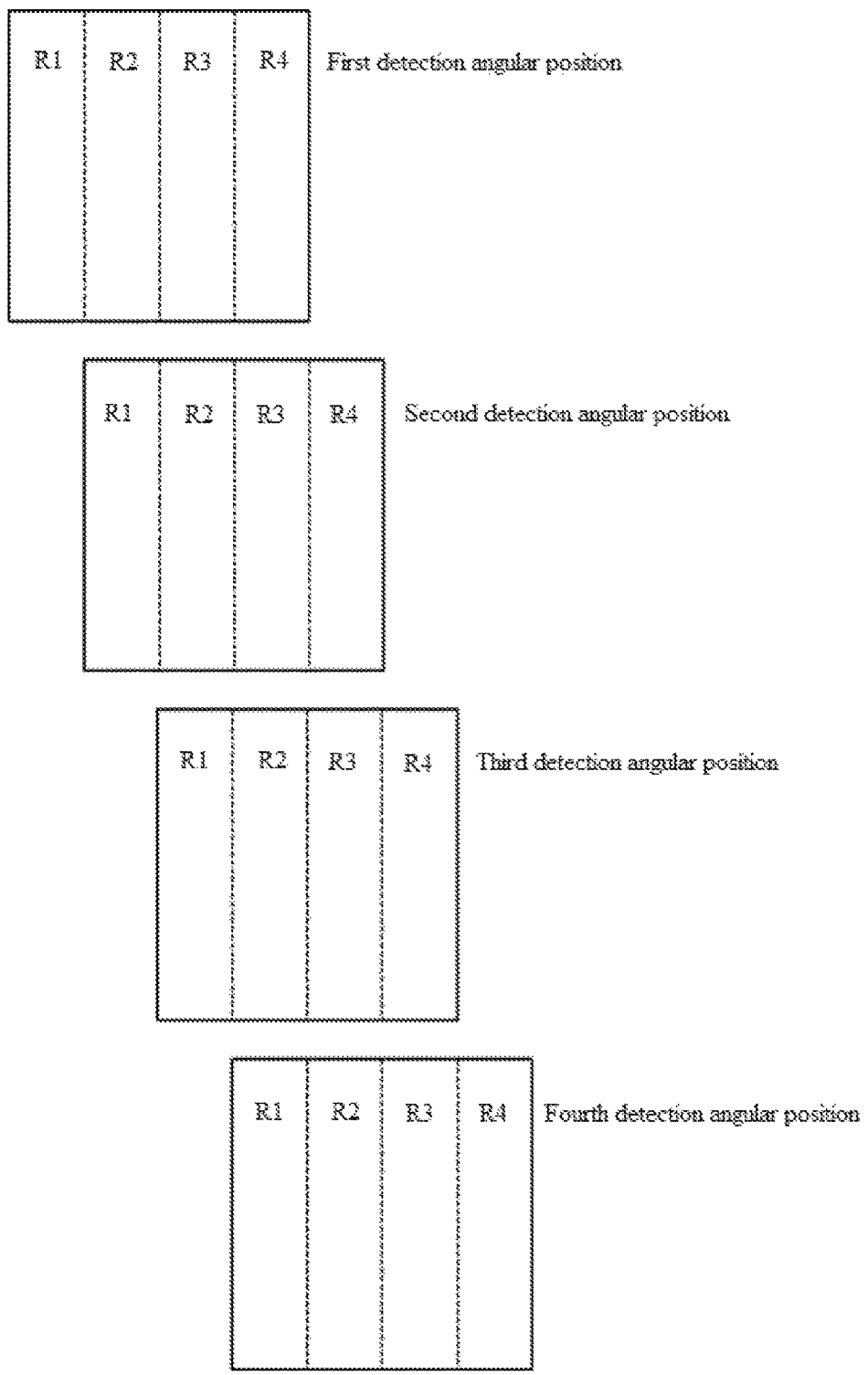
FIG. 5 is a schematic diagram illustrating correspondences between different rotation positions and photoelectric sensor positions in the fast scan detection method according to an embodiment of the present disclosure.

The fast scan detection method according to the present disclosure is described by taking distance detection using the Time of Flight method as an example. Four detection samplings DCS0 to DCS3 are required to calculate each distance value. However, the four detection samplings are not performed when the rotatable housing of the rotatable scan detection device is located in a same angle. Instead, when the rotatable housing of the rotatable scan detection device rotates to an angle, only one detection sampling is performed for the detection target region. Then the rotatable housing of the rotatable scan detection device rotates to a next angle, another detection sampling is performed by photoelectric sensors in a different area of the array photoelectric sensor for the same detection target region. After that, the rotatable housing of the rotatable scan detection device rotates to a next angle. That is, at each angle of the rotatable housing, only one detection sampling is performed, and four detection samplings are performed by the rotatable scan detection device, which rotates at a high speed, for the same detection target, thereby reducing the error in the distance value and eliminating the motion blur. The fast scan detection method according to the present disclosure is described in conjunction with the embodiment where four detection samplings DCS0 to DCS3 are performed to calculate one distance value. As shown in FIG. 5, the method includes the following steps 100 to 500.

In step 100, the emission light source emits infrared detection light modulated using a modulation signal. The infrared detection light propagates through the surrounding space and is reflected by a detected object when encountering the detected object. Meanwhile, a detection angular position of the rotatable scan detection device is recorded as a first detection angular position. The photoelectric sensor provided in the reception unit receives the infrared detection light reflected by the detected object, and converts a light signal into an electrical signal. At this detection angular position, the photoelectric sensor performs only one detection sampling (DCS0), and the detection sampling data is stored into a storage.

The photoelectric sensor is an array photoelectric sensor including multiple photoelectric sensors which are arranged in M rows and N columns and operate independently, where M is greater than or equal to 1, and N is greater than or equal to 2. In this embodiment, M equals to 8, and N equals to 8. For better illustrating the technical solution, 8 columns of photoelectric sensors are divided into 4 successive photoelectric sensor groups R1, R2, R3 and R4, each of which includes 2 columns of the photoelectric sensors.

The reason for which the above photoelectric sensors are divided into four photoelectric sensor groups is that, four detection samplings are required for calculating the distance value, and the photoelectric sensors are preferably divided into four photoelectric sensor groups such that scan detection can be performed more rapidly. However, the present disclosure is not limited thereto. In other embodiments, in the distance detection method where four detection samplings are required for one distance value, the photoelectric sensors may also be divided into eight photoelectric sensor groups, each of which includes at least one column of photoelectric sensors. In other embodiments, if the adopted detection method requires two detection samplings for one distance value, the eight columns of photoelectric sensors are preferably divided into two photoelectric sensor groups, each of which includes four columns of photoelectric sensors; and if the adopted detection method requires eight detection samplings for one distance value, the eight columns of photoelectric sensors are preferably divided into eight photoelectric sensor groups, each of which includes one column of photoelectric sensors. The above "column" is divided in a direction vertical to a horizontal direction in which the rotatable scan detection device rotates, i.e., the above "column" is required to be vertical to the rotation direction of the rotatable scan detection device. The above division of photoelectric sensor groups R1, R2, R3 and R4 is provided only for illustrating the fast scan detection method according the present disclosure, and is performed on only regions where different photoelectric sensors are located. Each of the photoelectric sensor groups R1, R2, R3 and R4 is used for converting light signals to electrical signals, operates independently, and has a same function.

In step 200, the rotatable housing of the rotatable scan detection device rotates to a second detection angular position. Similarly, the emission light source emits infrared detection light modulated using a modulation signal. The infrared detection light propagates through the surrounding space and is reflected by a detected object when encountering the detected object. The photoelectric sensor provided in the reception unit receives the infrared detection light reflected by the detected object, and convert a light signal into an electrical signal. At this detection angular position, the photoelectric sensor performs only one detection sampling (DCS1).

In the fast scan detection method according to the present disclosure, an angle relationship between the first detection angular position and the second detection angular position is that, detection regions in the surrounding space detected by the photoelectric sensor groups R1, R2 and R3 when the photoelectric sensor is positioned at the second detection angular position are the same as that detected by the photoelectric sensor groups R2, R3 and R4 when the photoelectric sensor is positioned at the first detection angular position. That is, at two neighboring detection angular positions, a horizontal viewing filed is shifted for an angle corresponding to one photoelectric sensor group, remaining detection regions detected by the photoelectric sensor groups are the same.

At the second detection angular position, the photoelectric sensor performs the second detection sampling (DCS1), and the detection sampling data is also stored into the storage.

In step 300, the rotatable scan detection device rotates to a third detection angular position. Similarly, the emission light source emits infrared detection light modulated using a modulation signal. The infrared detection light propagates through the surrounding space and is reflected by a detected object when encountering the detected object. The photoelectric sensor provided in the reception unit receives the infrared detection light reflected by the detected object, and convert a light signal into an electrical signal. In this detection angular position, the photoelectric sensor performs only one detection sampling (DCS2).

In the fast scan detection method according to the present disclosure, an angle relationship between the second detection angular position and the third detection angular position is that, detection regions in the surrounding space detected by the photoelectric sensor groups R1, R2 and R3 when the photoelectric sensor is positioned at the third detection angular position are the same as that detected by the photoelectric sensor groups R2, R3 and R4 when the photoelectric sensor is positioned at the second detection angular position.

At the third detection angular position, the photoelectric sensor performs the third detection sampling (DCS2), and the detection sampling data is also stored into the storage.

In step 400, the rotatable scan detection device rotates to a fourth detection angular position. Similarly, the emission light source emits infrared detection light modulated using a modulation signal. The infrared detection light propagates through the surrounding space and is reflected by a detected object when encountering the detected object. The photoelectric sensor provided in the reception unit receives the infrared detection light reflected by the detected object, and convert a light signal into an electrical signal. In this detection angular position, the photoelectric sensor performs only one detection sampling (DCS3).

In the fast scan detection method according to the present disclosure, an angle relationship between the third detection angular position and the fourth detection angular position is that, detection regions in the surrounding space detected by the photoelectric sensor groups R1, R2 and R3 when the photoelectric sensor is positioned at the fourth detection angular position are the same as that detected by the photoelectric sensor groups R2, R3 and R4 when the photoelectric sensor is positioned at the third detection angular position.

At the fourth detection angular position, the photoelectric sensor performs the fourth detection sampling (DCS3), and the detection sampling data is also stored into the storage.

The signal processing unit reads detection sampling data acquired in the first detection sampling DCS0 by the photoelectric sensor group R4 at the first detection angular position, detection sampling data acquired in the second detection sampling DCS1 by the photoelectric sensor group R3 at the second detection angular position, detection sampling data acquired in the third detection sampling DCS2 by the photoelectric sensor group R2 at the third detection angular position, and detection sampling data acquired in the fourth detection sampling DCS3 by the photoelectric sensor group R1 at the fourth detection angular position, and calculates the detection distance value of a same detection region in the surrounding space based on the above detection sampling data acquired in detection samplings DCS0 to DCS3.

In step 500, the rotatable housing continuously rotates and cyclically performs detection, and successively acquires distance values. At each detection angular position of the rotatable housing of the rotatable scan detection device, the detection regions in the surrounding space detected by the photoelectric sensor groups R1, R2 and R3 are the same as that detected by the photoelectric sensor groups R2, R3 and R4 when the rotatable housing is positioned at an immediate previous detection angular position (as shown in FIG. 5). At each detection angular position, the photoelectric sensor performs one detection sampling, and detection sampling data acquired in detection samplings DCS0, DCS1, DCS2 and DCS3 are stored in the storage. The signal processing unit calculates a distance value between the rotatable scan detection device and an object in the surrounding space corresponding to the photoelectric sensor area R1 at a current detection angular position of the rotatable scan detection device, based on the detection sampling data acquired by photoelectric sensors in the photoelectric sensor area R1 at the current detection angular position (i.e., the detection sampling data acquired in one of the detection samplings DCS0 to DCS3) and the stored detection sampling data acquired at immediately previous three detection angular positions for a same detection region in the surrounding space. Finally, distance values acquired at detection angular positions within 360 degrees are stitched to acquire a three-dimensional data image which covers horizontally 360 degrees and includes distance values at 8 different positions in a vertical direction.

In any of the above embodiments, the numbers of columns included in photoelectric sensor groups R1 to RX are the same. The number of columns of each photoelectric sensor group ranges from one to N divided by the number of required detection samplings inclusively, where N is the number of all columns of the photoelectric sensors.

In any of the above embodiments, a photoelectric encoder may be provided for determining the detection angular position at which the rotatable housing is positioned.

In any of the above embodiments, in order to acquire one scan detection distance value, the number of detection samplings required for the calculation is not limited to four, but may be any other number, such as two, six or eight. The fast scan detection method is applicable not only to a method or a device where four detection samplings is acquire for calculating one distance value, but also to a method or a device where the number of required detection samplings for calculating one distance value is two, six, eight or other numbers.

In any of the above embodiments, at X neighboring detection angular positions at which the rotatable scan detection device is positioned, the photoelectric sensors in X different areas of the array photoelectric sensor perform detection samplings on a same detection region in the surrounding space, where X is the number of detection samplings required for calculating each scan detection distance value.

In any of the above embodiments, the signal processing unit calculates a distance value between the rotatable scan detection device and an object in the surrounding space corresponding to the photoelectric sensor area R1 at the current detection angular position of the rotatable scan detection device based on the detection sampling data acquired by photoelectric sensors in the photoelectric sensor area R1 at the current detection angular position of the rotatable housing and the detection sampling data acquired at immediately previous Y detection angular positions for a same detection region in the surrounding space, where Y equals to the number of detection samplings required for calculating each scan detection distance value minus 1.

The detection method is applicable for an intelligent movable device such as a walking robot, a robot cleaner, or an unmanned aerial vehicle to perform single-line scanning or multi-line scanning on surrounding space. Based on the acquired distance information and in combination with a positioning and graph drawing algorithm, a map of the surrounding space can be reconstructed, a position of the intelligent movable device in the map can be determined, thus the intelligent movable device can autonomously plan a movement path and autonomously move.

The invention claimed is:

1. A scan detection method applied to a rotatable scan detection device, wherein the rotatable scan detection device comprises a plurality of photoelectric sensors which are arranged in M rows and N columns, M being greater than or equal to 1, N being greater than or equal to 2, the N columns constitute F groups, F being greater than or equal to 2, and each group comprises at least one column, wherein the method comprises:
performing one infrared light detection sampling to a same region of a detected object by each of the F groups of the plurality of photoelectric sensors in sequence by rotating the rotatable scan detection device to F different detection angular positions, to acquire infrared light detection sampling data of the same region of the detected object, wherein at each of the F detection angular positions, the one infrared light detection sampling is performed, and the infrared light detection sampling data comprise magnitudes of F detection sampling signals respectively having F different phases and respectively received by the F groups of the plurality of photoelectric sensors, wherein the F detection sampling signals are in one-to-one correspondence with the F detection angular positions; and
calculating a scan detection distance value between the rotatable scan detection device and the detected object with the magnitudes of the F detection sampling signals.

2. The scan detection method according to claim 1, comprising: providing at least one photoelectric sensor in each of the F groups of the plurality of photoelectric sensors.

3. The scan detection method according to claim 1, wherein the performing one infrared light detection sampling to a same region of a detected object by each of the F groups of the plurality of photoelectric sensors in sequence by rotating the rotatable scan detection device to different detection angular positions comprises:
performing one infrared light detection sampling to the same region of the detected object by each of one group of the plurality of photoelectric sensors and another group of the plurality of photoelectric sensors neighboring to the one group of the plurality of photoelectric sensors by rotating the rotatable scan detection device from one detection angular position to another detection angular position neighboring to the one detection angular position in a data processing period between the infrared light detection sampling of the one group and the another group of the plurality of photoelectric sensors, wherein the plurality of photoelectric sensors do not operate in the data processing period.

4. The scan detection method according to claim 1, further comprising:
stitching, by a signal processing unit, scan detection distance values acquired at detection angular positions within 360 degrees, to acquire a three-dimensional data image which covers horizontally 360 degrees and comprises scan detection distance values at M different positions in a vertical direction.

5. The scan detection method according to claim 1, wherein the infrared light detection sampling is based on a Time of Flight method, and F is equal to 4, wherein the step of calculating a scan detection distance value between the rotatable scan detection device and the detected object with the magnitudes of the F detection sampling signals comprises calculating the scan detection distance value according to the following formula:

$$D = \frac{1}{2} \frac{C}{2\pi f} \arctan\left(\frac{DCS0 - DCS2}{DCS1 - DCS3}\right),$$

wherein D is the scan detection distance value between the rotatable scan detection device and the detected object, C is the velocity of light in vacuum, f is a frequency of a modulation signal for modulating infrared detection light used in the infrared light detection sampling, and DCS0, DCS1, DCS2 and DCS3 are magnitudes of four detection sampling signals respectively having phases of 0 degrees, 90 degrees, 180 degrees and 270 degrees and respectively received by the four groups of the plurality of photoelectric sensors, wherein the four detection sampling signals are in one-to-one correspondence with the four detection angular positions.

6. The scan detection method according to claim 5, further comprising:
    stitching, by a signal processing unit, scan detection distance values acquired at detection angular positions within 360 degrees, to acquire a three-dimensional data image which covers horizontally 360 degrees and comprises scan detection distance values at M different positions in a vertical direction.

7. The scan detection method according to claim 1, wherein before the performing one infrared light detection sampling to a same region of a detected object by each of the F groups of the plurality of photoelectric sensors by rotating the rotatable scan detection device to different detection angular positions, the method comprises: arranging photoelectric sensors in each of the N columns in a direction vertical to a horizontal direction in which the rotatable scan detection device rotates.

8. The scan detection method according to claim 1, wherein:
    when one of the F groups of the plurality of photoelectric sensors is performing the infrared light detection sampling to the region of the detected object at one detection angular position of the rotatable scan detection device, the other F-1 groups of the plurality of photoelectric sensors at the same time perform infrared light detection samplings on F-1 other regions at the same detection angular position, respectively, and detection sampling signals respectively received by the F groups of the plurality of photoelectric sensors have F mutually different phases.

* * * * *